UNITED STATES PATENT OFFICE.

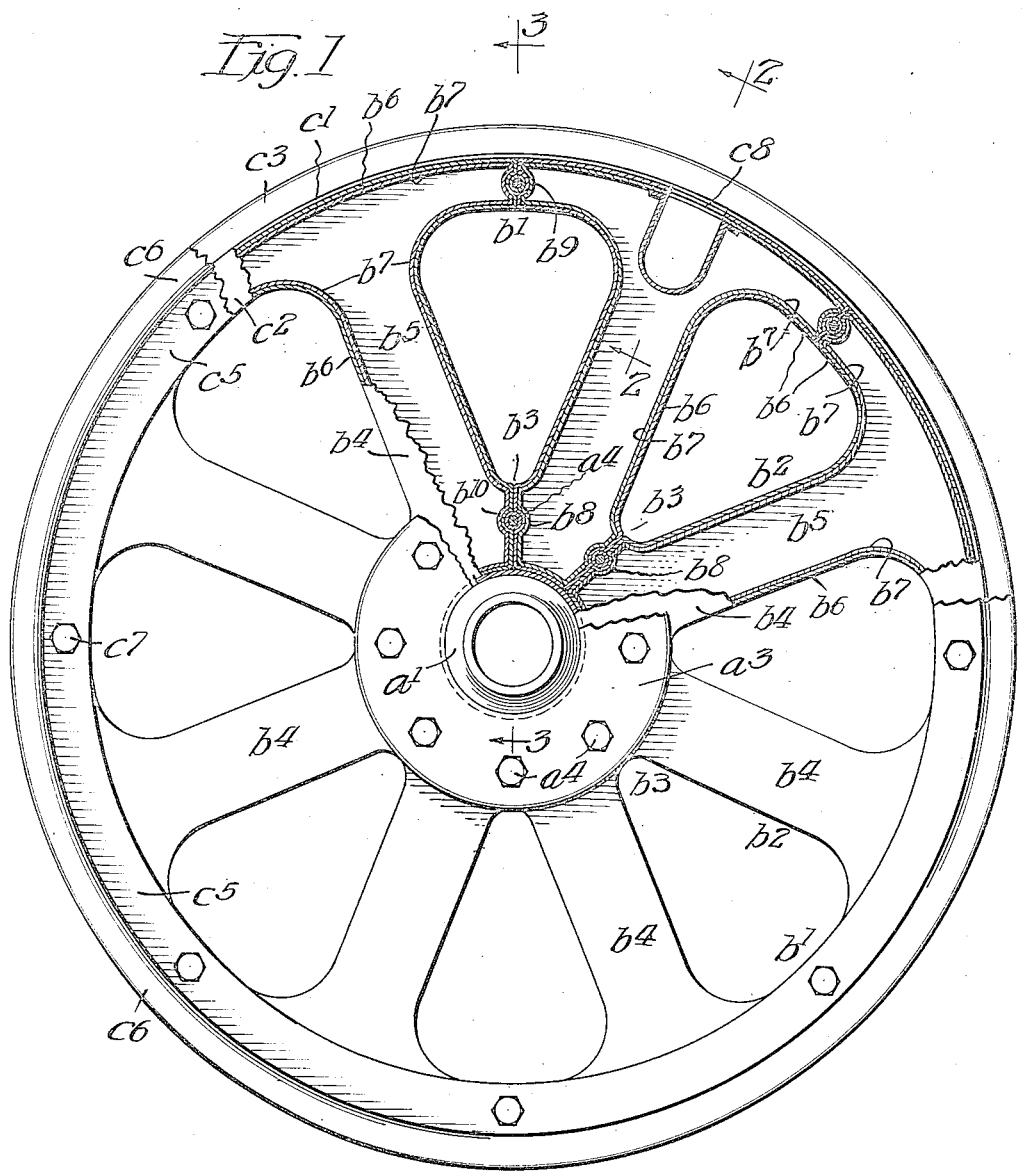

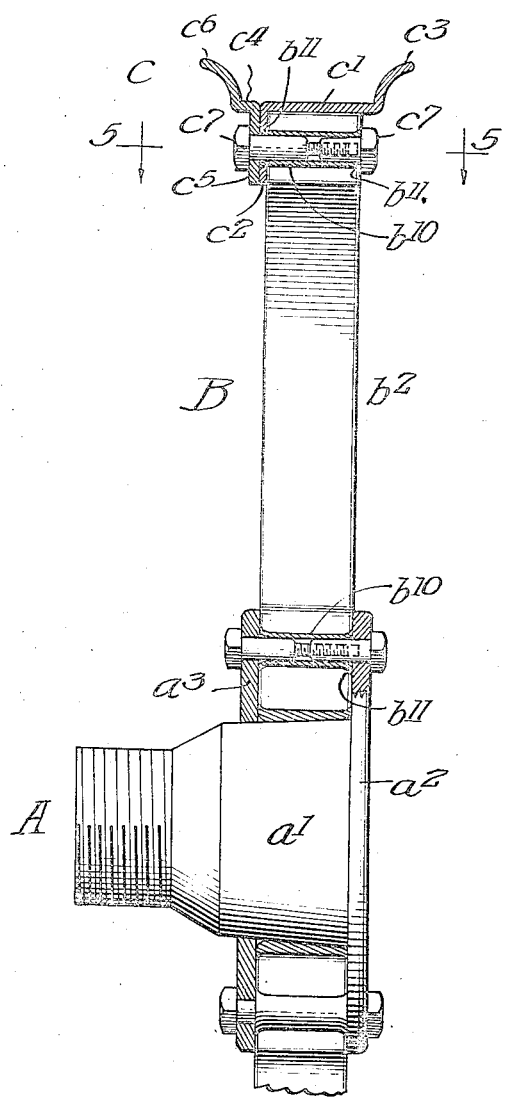
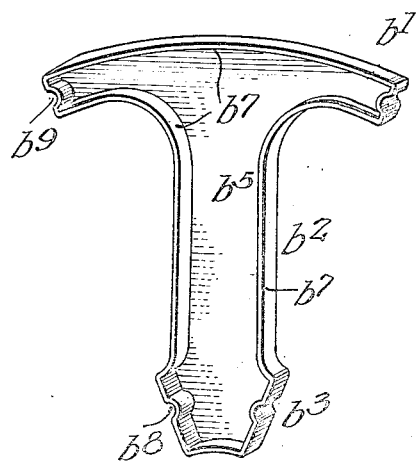
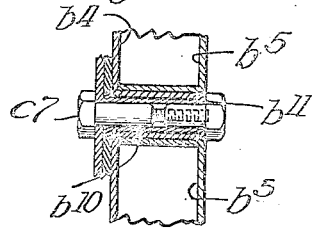

GERALD G. BARRY, OF CHICAGO, ILLINOIS.

METAL WHEEL.

1,422,168. Specification of Letters Patent. Patented July 11, 1922.

Application filed October 14, 1920. Serial No. 416,887.

*To all whom it may concern:*

Be it known that I, GERALD G. BARRY, a citizen of the United States, and a resident of Chicago, in the county of Cook and State of Illinois, have invented certain new and useful Improvements in Metal Wheels, of which invention the following is a specification.

The present invention was devised primarily for automobiles, although not limited to use on such vehicles, and it embraces a wheel wherein the supporting structure between the hub and tire carrying members is comprised of a series of pressed metal telescoped sections, each including a spoke and a portion of the felly and nave, assembled and secured as hereinafter described. The object of the invention is to provide a wheel which is light in weight, yet strong and capable of withstanding severe driving stresses, is of pleasing appearance and may resemble quite closely the ordinary wooden wheel, is simple and low in cost of construction, and has other advantages which will become apparent to the manufacturer and user of such wheels.

In the accompanying drawings forming part of this specification, like letters or marks of reference are used to designate similar parts throughout the several figures.

Fig. 1 is a side elevation of the new wheel, a portion of the body being broken away to expose details for explanatory reference; Fig. 2 is a detail section of the valve housing; Fig. 3 is a transverse section taken on the arrowed line 3—3 of Fig. 1; Fig. 4 is a view of one of the pressed metal unitary sections; and Fig. 5 is a detail of the means of securing the sections together and also securing the flanges of the tire carrying member to the supporting body.

The hub member, speaking generally, is designated by A. The hub in connection with which the new structure is here illustrated may be recognized as an ordinary form of automobile front wheel hub, but, of course, any other suitable hub or shaft member may be employed. In that shown, $a'$ is the main hub body; $a^2$ denotes the customary integral flange extending outwardly from and following circumferentially around the inner end of the main hub body; and $a^3$ is a removable flat ring or clamping plate, between which and the integral flange $a^2$, on the inside of the wheel, the new supporting structure, to be presently described may be secured in place upon the central hub body by the bolts or other suitable fastening means $a^4$, much the same as the common wooden spokes and nave are secured.

Element B, the new metal supporting structure between the hub A and the tire carrying rim C, is comprised of a series of similar sections preferably drawn from sheet metal, each section or unit embracing a segment of the felly and central nave and also a connecting spoke. Fig. 1 shows a wheel of eight such unitary sections. The felly portion is marked $b^1$, the spoke body $b^2$ and the nave portion $b^3$. Fig. 4 illustrates one of the pressed metal "box" sections, each unit, however, preferably consisting of two such complemental members, as indicated in the sectionized portion of Fig. 1, one being formed just sufficiently smaller than the other that the flanged sides of the two can be telescoped together. For distinction, I have further marked the face of the outer member as $b^4$ and the face plate of the inner complemental member as $b^5$. These are exactly alike in outline, however, except that one is slightly smaller than the other, as already mentioned, to permit of the flanges being telescoped. The respective series of face plates $b^4$ and $b^5$ are parallel but spaced apart substantially the width of the ordinary wooden structure, as shown in Figs. 2—3 and 5. The original blank from which each of the complemental members is formed is sufficiently large so that an integral flange is drawn or struck over therefrom, the flange on the outer face plate $b^4$ being here marked $b^6$ and that on the inner face plate $b^5$ being marked $b^7$. These integral flanges, it will be observed, follow continuously around the entire outline of their respective main face plates, (notice Fig. 4 and Fig. 1), so that when the two complemental members are telescoped together same form a tight hollow box. The depth of these flanges $b^6$ and $b^7$ preferably corresponds to the width of the supporting structure, so that when the flange $b^7$ is forced within the flange $b^6$ there is a double thickness of the sheet metal around the entire outline of each unit and preferably extending substantially across the spaced distance between the parallel plates $b^4$ and $b^5$. It will be apparent that with the use of a relatively thin and light weight sheet metal a supporting structure of unitary sections constructed and assembled as herein shown will have the capacity to withstand severe side-thrust as well as other driving stresses.

Near the hub end or nave of each unit the flanges are pressed or formed so as to provide a half round channel $b^8$, which, matched up with the corresponding channel on the adjacent unit, forms an opening in the nave through which the clamping bolt $a^4$ may pass and makes unnecessary drilling the nave body for this purpose. The outer or felly ends of each unit may be similarly formed, and the detachable rim securing means pass therethrough as illustrated at $b^9$.

To secure the series of units together, however, so as to form the supporting structure,—in fact to form a wheel complete in itself, with the felly, spokes and central nave,—the adjacent sections or box units, after being forced together into the form of the complete wheel, are joined by inserting in these openings formed by the half round channels in the adjacent units, both at the nave $b^8$ and the felly section channels $b^9$, a flanged tube or ferrule $b^{10}$, extending clear through. One end of these tubes or ferrules $b^{10}$ may be provided with a flange $b^{11}$, the tube being then forced through and the flange brought tight against the face plate on that side, and then the opposite extended end of the tube $b^{10}$ is upset or swedged over so as to form a similar flange $b^{11}$. It will be observed that when the entire series have been thus united by these flanged tubes or ferrules, the circular walls of which fit partly into two adjacent units, a complete secure wheel structure is furnished. The units cannot become displaced or shifted laterally, nor can the same be withdrawn from such assembled relation without removing the flanged tubes.

C denotes the rim or tire carrying element. As the new wheel was devised mainly for automobiles the drawings illustrate my preference in this connection, although it will be obvious that other forms of rims may be employed; in fact, the ordinary demountable tire carrying rim may be detachably secure upon the metal felly. In the drawings, more particularly referring to the transverse section Fig. 3, however, I have shown a rim band $c^1$ directly fitted upon the outer flange of the felly of the new supporting body. This band has an inwardly directed integral flange $c^2$ closely fitting against the face of the felly, and also an outwardly directed and flaring flange $c^3$ on the opposite edge. This rim band $c^1$ is pressed on and the flanged tube or ferrule $b^{10}$ may extend through the rim flange $c^2$ and serve to permanently secure this part of the tire carrying element to the supporting body B. A further band $c^4$, having an inwardly directed straight flange $c^5$ and an outwardly directed flaring flange $c^6$ is also provided, and the flange $c^5$ is detachably secured against the flange $c^2$ and felly, as shown, by means of a series of bolts and nuts $c^7$, these bolts extending through the flanged tubes $b^{10}$, similar to the central bolt members $a^4$, and operating the same as demountable tire carrying rims are ordinarily secured upon a wheel, except that in the case of the rim here illustrated the entire rim is not demounted but the side or outer half only detached. The cross-section of this rim will be recognized as one suitable for a "straight side" pneumatic tire, not here shown.

The whole supporting body, it will be noticed, can also be similarly readily attached and detached at the hub. I prefer to provide the fastening bolts with enlarged tapered shanks, one provided with the male and the opposite side with the female thread, and as the two are drawn together the tapered shanks wedge more tightly against the outer edges.

Referring more particularly to Fig. 1 and Fig. 2, an opening $c^8$ is provided through the rim and the outer flanges of one section of the felly of the supporting body to receive the customary valve of the pneumatic tire, where such a tire is employed. The inner wall or plate $b^5$ of this unit is suitably formed to provide a housing, or an opening cut to permit access to the valve. A swinging shutter may be provided to keep out dirt and the like.

The snugly telescoped relation of the flanges of the series of "box" units or sections into which the supporting body is divided should be carefully noted in the several figures of the drawings. The strain resisting capacity of such a structure is very great, although relatively thin sheet steel is employed. A wide foundation is furnished, and the double thickness of the flanges extending across the full width of the supporting body performs important functions is resisting lateral strains or side thrusts which cause "buckling." The main drawbacks found with the ordinary metal wheel on automobiles is the difficulty of fastening to the hub and the danger of "buckling." The comparative advantages of a wheel structure constructed and assembled in accordance with my invention will be quite obvious.

It will be apparent that various changes may be made in the wheel herein chosen for illustration without departing from the spirit and scope of my invention, and I do not wish any undue limitation to result from the detailed description given, but desire the claims appended hereto to be construed as broadly as possible in view of the prior art relating to such wheels.

What I claim as new and desire to secure by Letters Patent is the following:

1. In a wheel, a nave, spoke and felly structure comprising a series of independent metal box units, each said unit consisting of a complemental pair of boxes having the outline and flanged substantially as shown, formed, telescoped and assembled substantially as set forth.

2. In a wheel, a supporting structure between the hub and rim comprising a series of units, each consisting of a main face plate including a section of the nave, the felly and spoke connecting the nave and felly sections, and having an integral flange formed substantially at right angles to such main plate and following continuously around the outline thereof, and the series of units being arranged in abutting relation at the nave and felly, substantially as shown and described.

3. In a wheel of the character described, hollow metal supporting units between the hub and rim, each unit including a section of felly, nave and spoke connecting the felly and nave, formed in one piece and having an integral flange following continuously around the said outline of said units, substantially as shown and described.

4. In a wheel, as a substitute for the common wooden nave, spokes and felly structure, the herein described metal structure comprising a plurality of unitary "box" sections, each section consisting of a complemental pair of telescoped boxes, the face of each box including a portion of the felly, nave and spoke connecting the same, and having formed integral with such face a flange following continuously around the entire outlined edge of said section, the flange being at right angles to the face of the section, in a plane parallel to the axis and extending substantially across the width of the structure, and a similarly formed metal box snugly telescoped within the other, and means for securing the said unitary sections, substantially as set forth.

5. In a wheel, as a substitute for the common wooden nave, spokes and felly structure, a metal structure consisting of a plurality of unitary sections, the face of each section including a portion of the felly, nave and spoke connecting the felly and nave portions and having formed integral with such face a flange following continuously around the entire outlined edge of said unitary sections, the flange being substantially at right angles to the face of the section in a plane parallel to the axis and extending substantially across the width of the structure, the series of sections being arranged to abut at adjacent nave and felly portions, and means for securing the said unitary sections in the wheel structure.

In testimony whereof, I have hereunto signed my name to this specification.

GERALD G. BARRY.